(12) United States Patent
Friedrich

(10) Patent No.: US 7,503,287 B2
(45) Date of Patent: Mar. 17, 2009

(54) SYSTEM, METHOD AND APPARATUS FOR HEATING WATER

(75) Inventor: Brent Friedrich, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 10/595,334

(22) PCT Filed: Oct. 20, 2004

(86) PCT No.: PCT/US2004/034659

§ 371 (c)(1),
(2), (4) Date: Apr. 10, 2006

(87) PCT Pub. No.: WO2005/041731

PCT Pub. Date: May 12, 2005

(65) Prior Publication Data

US 2007/0127899 A1     Jun. 7, 2007

Related U.S. Application Data

(60) Provisional application No. 60/523,177, filed on Nov. 18, 2003, provisional application No. 60/512,684, filed on Oct. 20, 2003.

(51) Int. Cl.
*F24H 9/20*     (2006.01)
(52) U.S. Cl. .................. 122/14.22; 122/4 A; 392/451
(58) Field of Classification Search ........... 122/14.22, 122/4 A, 13.3, 14.1, 14.3; 392/441, 449, 392/451, 454, 455; 236/20 R; 219/483, 219/486
See application file for complete search history.

(56) References Cited

U.S. PATENT DOCUMENTS

| | | | | |
|---|---|---|---|---|
| 2,894,109 A | * | 7/1959 | Kendon | 392/451 |
| 4,480,173 A | * | 10/1984 | Butterfield | 392/401 |
| 5,103,801 A | * | 4/1992 | Herring et al. | 126/374.1 |
| 5,285,717 A | * | 2/1994 | Knepler | 99/282 |
| 5,422,976 A | | 6/1995 | Knepler | |
| 5,626,287 A | * | 5/1997 | Krause et al. | 236/20 R |
| 5,647,055 A | * | 7/1997 | Knepler | 392/451 |
| 5,968,393 A | * | 10/1999 | Demaline | 219/492 |
| 6,075,923 A | | 6/2000 | Wu | |
| 6,293,230 B1 | * | 9/2001 | Valcic et al. | 122/13.01 |
| 6,350,967 B1 | * | 2/2002 | Scott | 219/497 |
| 6,633,726 B2 | | 10/2003 | Bradenbaugh | |
| 6,649,881 B2 | * | 11/2003 | Scott et al. | 219/492 |
| 6,836,615 B1 | * | 12/2004 | Bradenbaugh | 392/449 |
| 6,955,301 B2 | * | 10/2005 | Munsterhuis et al. | 236/20 R |

* cited by examiner

*Primary Examiner*—Gregory A Wilson
(74) *Attorney, Agent, or Firm*—Barnes & Thornburg LLP

(57) ABSTRACT

Disclosed are a water heating system, a method of heating water and a water heating apparatus for use in providing successive volumes of heated water at a generally consistent temperature. In one aspect of the disclosure, a water heating system includes a reservoir (22) for containing water (28), the reservoir having an inlet zone (50) comprising a lower portion of the reservoir and an outlet zone comprising an upper portion of the reservoir. A water inlet (38) is provided in fluid communication with a source (34) of water and the inlet zone. A heater (26) is positioned within the inlet zone is coupled to the reservoir. A temperature sensor (30) is positioned within the inlet zone, and a water outlet (46) is provided in fluid communication with the outlet zone. A controller (24) is coupled to the heater and the temperature sensor, the controller using information from the temperature sensor to controllably operate the heater to generally maintain a desired temperature within the reservoir.

49 Claims, 4 Drawing Sheets

SYSTEM, METHOD AND APPARATUS FOR HEATING WATER

BACKGROUND

This disclosure relates to a water heating system, a method of heating water and a heated water apparatus that are designed to provide generally consistent exit water temperature from a heated water reservoir after intermittent cycles or semi-continuous heated water discharge.

There are many instances, particularly in the food and beverage industries, where a volume of heated water is required to prepare a beverage such as coffee, tea or hot chocolate or a food product, such as dough, beans or mashed potatoes. It is desirable to prepare such beverage and food products with a volume of heated water having a generally predetermined temperature or range of temperatures to affect product characteristics.

For example, various types of water heating systems, such as automatic beverage brewing systems, are known for providing heated water. A typical water heating system for producing beverages includes a heated water reservoir that retains a predetermined volume of water in a heated state. Often, it is desirable to brew a beverage using water having a temperature or temperature range near or below the boiling point of water, i.e. 200° F. ±5°. The heated water is dispensed from the heated water reservoir over a brewing substance for producing a brewed beverage, such as coffee or tea. When a brewing temperature below the desired brewing temperature is used, the extraction of certain oils, solids and other characteristics from the brewing substance may be less than nominal resulting on poor flavor characteristics of the beverage.

The heated water dispensed for use is displaced in the heated water reservoir with fill water which is introduced to the reservoir generally at the time of dispensing.

The fill water is generally at a temperature level below the desired or target temperature or temperature range of the heated water in the reservoir and the temperature for brewing. Displacement of the heated water retained in the water reservoir by unheated fill water requires the unheated fill water to be heated to and maintained at a target temperature or range for use to achieve a desired product.

When consecutive volumes of heated water are drawn from the heated water reservoir, and are replaced by unheated fill water, a problem may be created because the unheated fill water may not reach a desired temperature prior to being drawn from the heated water reservoir.

SUMMARY

The disclosure includes a water heating system, a method of heating water and a heated water apparatus for use in providing successive volumes of heated water at a generally consistent temperature or within a temperature range A disclosed water heating system includes a reservoir for containing water, the reservoir having an inlet zone comprising a lower portion of the reservoir and an outlet zone comprising an upper portion of the reservoir. A water inlet is provided in fluid communication with a source of water and the inlet zone. A heater is positioned proximate to the inlet zone. A temperature sensor is positioned proximate to the inlet zone, and a water outlet is provided in fluid communication with the outlet zone. A controller is coupled to the heater and the temperature sensor, the controller using information from the temperature sensor to controllably operate the heater to maintain a desired temperature within the reservoir.

A disclosed heated water apparatus is provided having a reservoir for containing water, the reservoir having an inlet zone comprising a lower portion of the reservoir and an outlet zone comprising an upper portion of the reservoir. A water inlet is provided for fluid communication with a source of water for delivering water to the inlet zone. A heater positioned proximate to the inlet zone and a temperature sensor positioned proximate to the inlet zone are coupled to the reservoir. A water outlet is provided in fluid communication with the outlet zone.

A method of heating water in a water heating apparatus having a reservoir is also disclosed. The method comprises the steps of operating a water-inlet control valve to dispense water into an inlet zone of the reservoir; sensing the temperature of water within the inlet zone; and operating a heater having a heating element positioned proximate the inlet zone to impart energy to heat the water.

Other features of the disclosure will be set forth in part in the description which follows and the accompanying drawings, wherein the embodiments of the disclosure are described and shown, and in part will become apparent upon examination of the following detailed description taken in conjunction with the accompanying drawings.

BRIEF DESCRIPTION OF THE DRAWINGS

The detailed description particularly refers to the accompanying figures in which.

DETAILED DESCRIPTION

Figure 1:
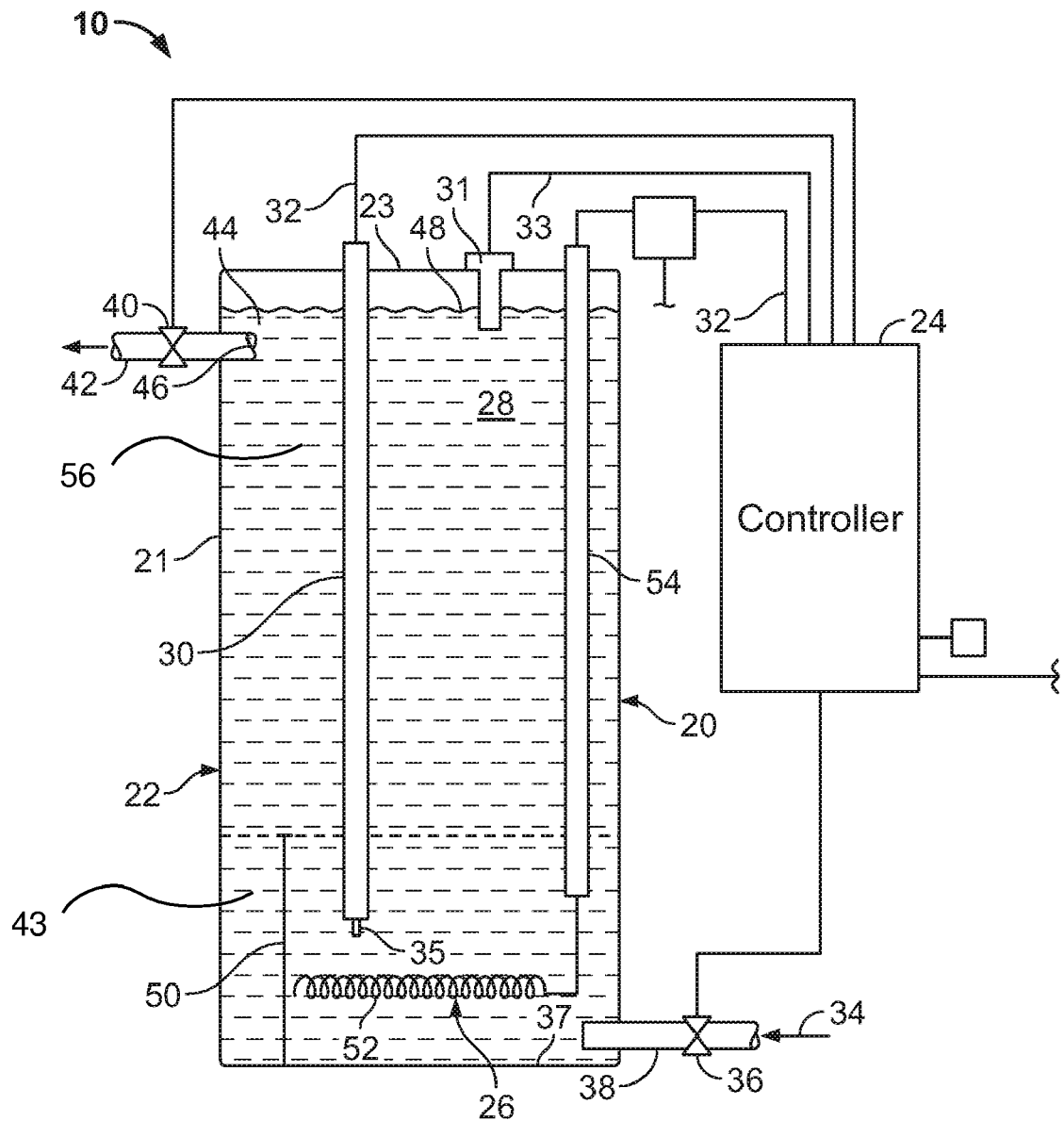
FIG. 1 is a diagrammatic illustration of a water heating system.

While the concepts of the present disclosure will be illustrated and described in detail in the drawings and forthcoming description, such an illustration and description is to be considered as exemplary and not restrictive in character, it being understood that only the illustrative embodiments are shown and described and that all changes and modifications that come within the spirit of the disclosure are desired to be protected. There are a plurality of advantages that may be inferred from the present disclosure arising from the various features of the apparatus, systems, and methods described herein. It will be noted that alternative embodiments of each of the apparatus, systems, and methods of the present disclosure may not include all of the features described yet still benefit from at least some of the inferred advantages of such features. Those of ordinary skill in the art may readily devise their own implementations of an apparatus, system, and method that incorporate one or more of the features of the present disclosure and fall within the spirit and scope of the invention as defined by the appended claims.

Terms including brewed, brewing, brewing substance, brewing liquid, beverage, and brewed beverage as used herein are intended to be broadly defined as including but not limited to the brewing of coffee, tea and any other brewed beverage. This broad interpretation is also intended to include, but is not limited to any process of dispensing, infusing, steeping, reconstituting, diluting, dissolving, saturating or passing a liquid through or otherwise mixing or combining a beverage substance with a liquid such as water without a limitation to the temperature of such liquid unless specified, This broad interpretation is also intended to include, but is not limited to beverage substances such as ground coffee, tea liquid beverage concentrate, powdered beverage concentrate, freeze dried coffee or other beverage concentrates, to obtain a desired beverage or other food.

Referring now to the drawings, wherein like parts are designated by the same reference numerals, FIG. 1 of the present disclosure illustrates a water heating system The water heating system 10 includes a heated water apparatus 20 having a reservoir 22 and a controller 24 for controlling the apparatus 20. A heater 26 is coupled to the reservoir 22 and to the controller 24 to controllably heat water 28 retained in the reservoir 22. A temperature sensor 30 is coupled to the reservoir 22 and to the controller 24 for detecting the temperature of the water 28 within the reservoir 22. The temperature sensor 30 may be of any known construction, such as a thermocouple device, and provides a signal over line 32 to controller 24. A water sensor 31 may be coupled to the reservoir 22 and to the controller 24 for at least detecting at least one of the presence and absence of a desired quantity of water 28 in the reservoir 22. The water sensor 31 is of a known construction and may provide a signal over line 33 to controller 24. Additional sensors and control elements, such as steam sensors of known construction, may be provided for additional feedback and control of the system 10 and are contemplated by this disclosure.

Figure 2:
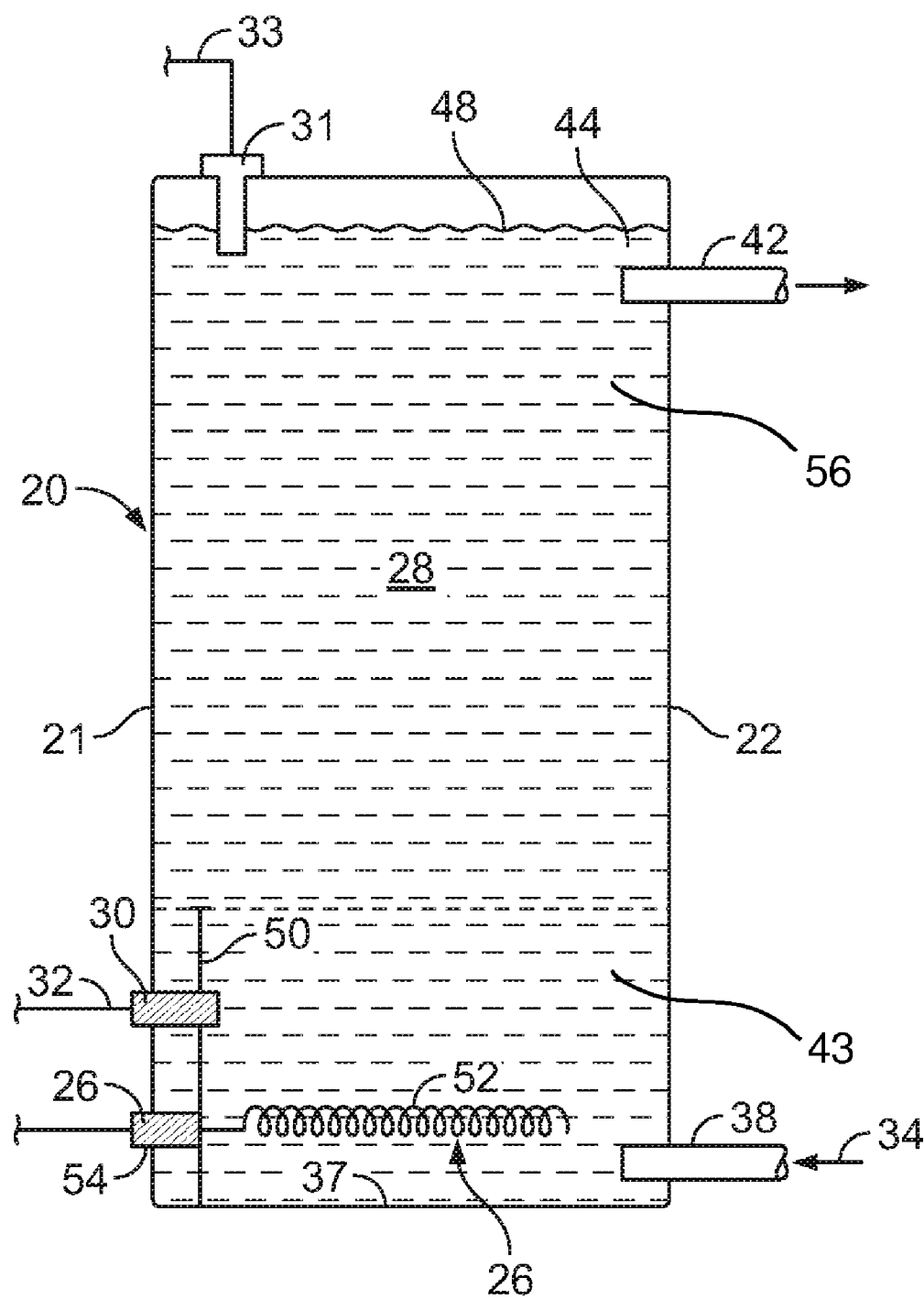
FIG. 2 is a cross-sectional illustration of a water heating apparatus.
Figure 4:
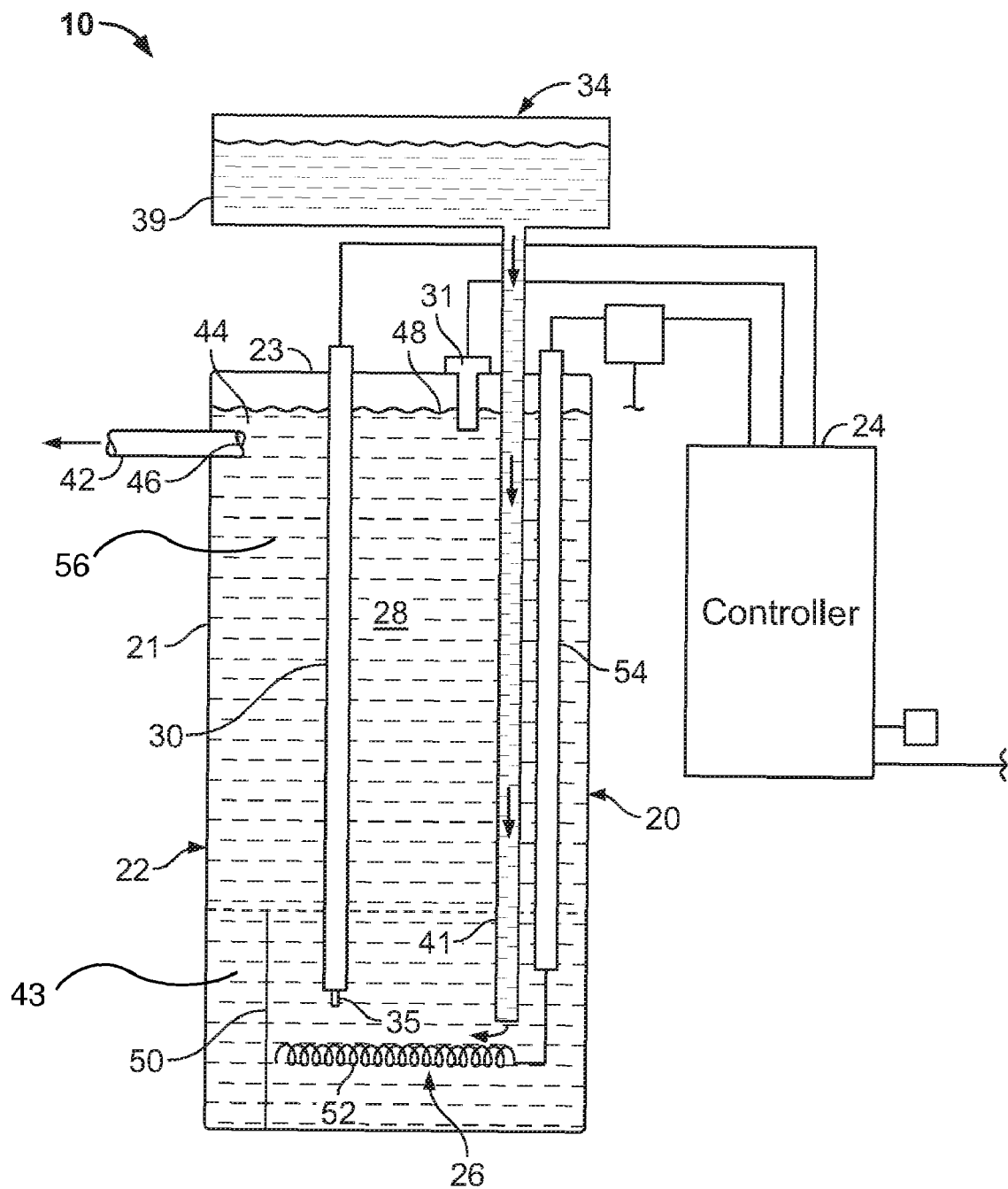
FIG. 4 is a diagrammatic illustration of a water heating system having a pour over basin as a water source.

A water source 34 is coupled to the reservoir 22 to introduce water into the reservoir 22. The water source 34 as illustrated in FIGS. 1 and 2 is a pressurized water line 38 and includes a controllable inlet valve 36 which is coupled to the inlet line 38 and the controller 24. As shown in FIG. 4, the water source 34 may also be in the form of amour over basin 39 communicating with a fill tube 41. Water disposed in the basin 39 flows under gravity through the fill tube 41 towards an inlet zone.50 of the reservoir 22. The inlet line 38 is advantageously positioned proximate the bottom or lower area 43 of the reservoir 22. A controllable outlet valve 40 may be coupled to an outlet line or heated water discharge line 42 which communicates with the reservoir 22. Discharge line 42 alternatively may be in communication with a faucet and/or a food preparation or beverage brewing device of known construction (not shown). The controllable outlet valve 40 is coupled to the controller 24. Alternatively, the valve 40 may be eliminated to allow the water to flow based only on displacement water pressure or flow in relation to the inlet line pressure 38. In the embodiment employing the valve 40, a quantity of water 28 is retained in the. Reservoir 22 and it may be to maintain a head 44 of the water 28 above the port 46 of the heated water line 42.

During a discharge/fill process, the inlet valve 36 is operated to allow water to flow through the inlet line 38 into the reservoir 22 to replace the heated water discharged. It is controlled by the water sensor 31 or by time alone, depending on the machine design. The period of time is dependent upon the quantity (volume) of heated water to be discharged, which may be dictated by the end use of the heated water (i.e., beverage brewing, cooking a food product etc.) As selected by the operator at the controller 24. Water enters the reservoir 22 in an inlet zone or lower portion 50 of the reservoir 22. The inlet zone 50 defames a portion of the reservoir 22 having a volume ranging up to, generally, a maximum or range of predetermined discharge volumes. The inlet zone and outlet zone define a volume approximately equal to a unit of volume to be dispensed. One or more units of volume to be dispensed may be provided for in the total volume of the reservoir, generally between the inlet zone and outlet zone. The discharge volume or unit volume may be determined by the desired application or end use of the system 10. By way of example but not limitation, a reservoir for a beverage brewing system may contain approximately three discharge volumes (i.e., brew volumes) of heated water. The number of maximum desired discharge volumes contained in the reservoir 22 may depend on the reservoir volume, which may be designed with regard to the intended use. The reservoir may be designed to include additional maximum desired discharge volumes, especially when the frequency of discharge/fill cycle is high. This disclosure is not limited in the number or size of the maximum discharge volume.

Depending on the size of the reservoir 22 and the frequency of discharges, a person skilled in the art can readily determine the appropriate maximum desired discharge volume and number of such volumes to hold within the reservoir 22 for one or a variety of applications. For purposes of illustration and not limitation, the inlet zone 50 of FIG. 1 is depicted as approximately the lower one third volume of the reservoir 22. For other applications wherein the discharge volume is smaller, but discharge/fill cycles occur more frequently, the inlet zone may approximate a smaller fraction of the reservoir volume. Generally, the outlet valve 40 will be controlled for the same period of time. However, the inlet valve 36 may be controlled by the controller 24 for a shorter period of time, especially if the inflow rate through the inlet line 38 is greater than the outflow rate through the heated water line 42.

The heater 26 may be in the form or a heating element 52 shown as an active heating, such as a resistive heat element, which is controllable to provide energy to the water 28, and thus raise the temperature of the water 28. It is within the scope of this disclosure that the heating element may be embodied in other forms to controllably provide energy to the water in the reservoir 22. It should be noted that the heater 26 may take many different forms and configurations and the heating element 52 shown herein, is only provided by way of background. It is envisioned that any form of heating element providing heat or other energy, directly or indirectly, to the water 28 contained in the reservoir 22 is fully within the scope of the present disclosure and are considered to be broadly interpreted and included herein. While a resistive type of heating element 52 is shown in the present diagrammatic illustrations, it is envisioned that various other forms of heating elements such as external blanket heating elements which contact or otherwise are positioned proximate to the reservoir 22 are within the scope of the present disclosure. Additionally, other forms of providing energy including mechanical, vibration al, microwave or other sources such as passive heating elements are considered to be included within the scope of the present disclosure.

The active heating element 52 as shown is immersed in the reservoir water and positioned substantially within the inlet zone 50, and may be as close to the bottom 37 of the reservoir 22 as practical. Due to deposit build-up such mineral deposits; for example, lime in the bottom of the reservoir 22, the heating element 52 may generally be positioned a distance away from the bottom 37 to reduce deposit interference with the transfer of heat energy from the heating element 52 to the surrounding water 28. While the heater is positioned in close proximity to the bottom, it should be positioned a distance away from the bottom sufficient to prevent accumulation of mineral deposits extending between the active heating portion and the bottom. The heater 26 depicted in FIG. 1 comprises a top-mounted heater, i.e., the heater 26 is coupled to the reservoir through a top or lid 23. In this embodiment, the heater 26 also includes a cold pin 54. The cold pin 54 comprises a portion of heater 26 that does not actively transmit heating energy to the water 28. The cold pin 54 advantageously may be as long as possible (without violating watt density requirements), such that a substantial portion of the active heating element 52 is positioned within the inlet zone 50. As such, a substantial portion of the active heat transfer from the heater 26 to the water 28 occurs in the inlet zone 50.

As illustrated in FIG. 1, the temperature sensor 30 is positioned within the reservoir 22 such that the temperature of the water 28 in the inlet zone 50 is detected. In FIG. 1, the temperature sensor 30 is also a top-mounted sensor (being coupled to the reservoir 22 at top 23), but is adapted to detect temperature at a lower end 35 of the sensor 30. The lower end 35 of the temperature sensor 30 is advantageously positioned to detect the temperature of the water 28 within the inlet zone at a position above the active heat element 52. The temperature sensor 30 should be positioned within zone 50 but a distance above the heater element 52. The top positioned heater and top mounted sensor may be useful for purposes of service of the device. These devices may be carried on and extend through the top 23 and extend a desired distance into the reservoir. The top 23 is carried on the reservoir 22. The reservoir 22 is defined by a wall 21. In this regard, the reservoir may be contained in a brewer or other device with additional components surrounding it. With the top mounted configuration, the access to the sensor and heating element may allow a service technician to remove the top and these elements without having to remove additional components surrounding the reservoir. Additionally, there is a benefit such that a seal can be provided on the lid 23 of a known configuration and in which the seal is in a non-submerged or non-flooded area.

The heater 26 and temperature sensor need not be top-mounted, as illustrated in FIG. 2. FIG. 2 illustrates a heated water apparatus 20 including a side-mounted heater 26 having an active heat element 52 positioned within inlet zone 50, and a side-mounted temperature sensor 30 positioned to detect the temperature within the inlet zone 50, at a point above the heater element 52. Also, one or more of the devices could be similarly mounted in the bottom 37, as well.

Upon initiating a discharge/fill cycle, such as when a volume of heated water 28 is discharged through discharge line 42 for use, the controller 24 may determine whether the quantity of water in the reservoir 22 is at a desired water level 48. If water 28 is not at the sensing level of 31, the controller 24 will interpret the water as being below the desired level and the controller 24 will open the inlet valve 36. It is desirable to maintain the water level generally consistent throughout the discharge/fill cycle so as to maintain a desired quantity of water in a heated condition and to maintain a generally consistent flow through the discharge line 42. The water source 34 provides water at a flow rate through the inlet line and the inlet valve 38, 36 at a rate which is generally equal to or slightly greater than the outflow rate through the outlet valve 40 and the heated water line 42.

When the temperature sensed by the temperature sensor 30 falls below a predetermined temperature level or range, the controller may activate the heater 26 over line 32 to increase the temperature of the water 28. It should be noted that if periodic measurements are made by sensor, the controller may develop a trend and anticipate the resulting decline in temperature based on programming relating to such trend analysis. As water is heated by the heater 26, convection flow tends to cause higher temperature water to rise to an upper portion or outlet zone 56 of the reservoir 22. The discharge of heated water 28 is drawn from port 46 located in the outlet zone 56. The controller 24 may also operate the heater 26 between discharge/fill cycles, if a temperature less than a desired temperature is detected by the temperature sensor 30. During periods between discharges, the water 28 in reservoir 22 may lose heat to the surroundings, even if the reservoir is insulated. As such, convection flow tends to cause cooler water to sink to the bottom of the reservoir 22. When sufficient cooler water 28 has descended to the inlet zone 50 by convection and the temperature sensor 30 detects a temperature lower than a desired temperature or range, the controller may operate the heater 26 to heat the water 28.

Figure 3:
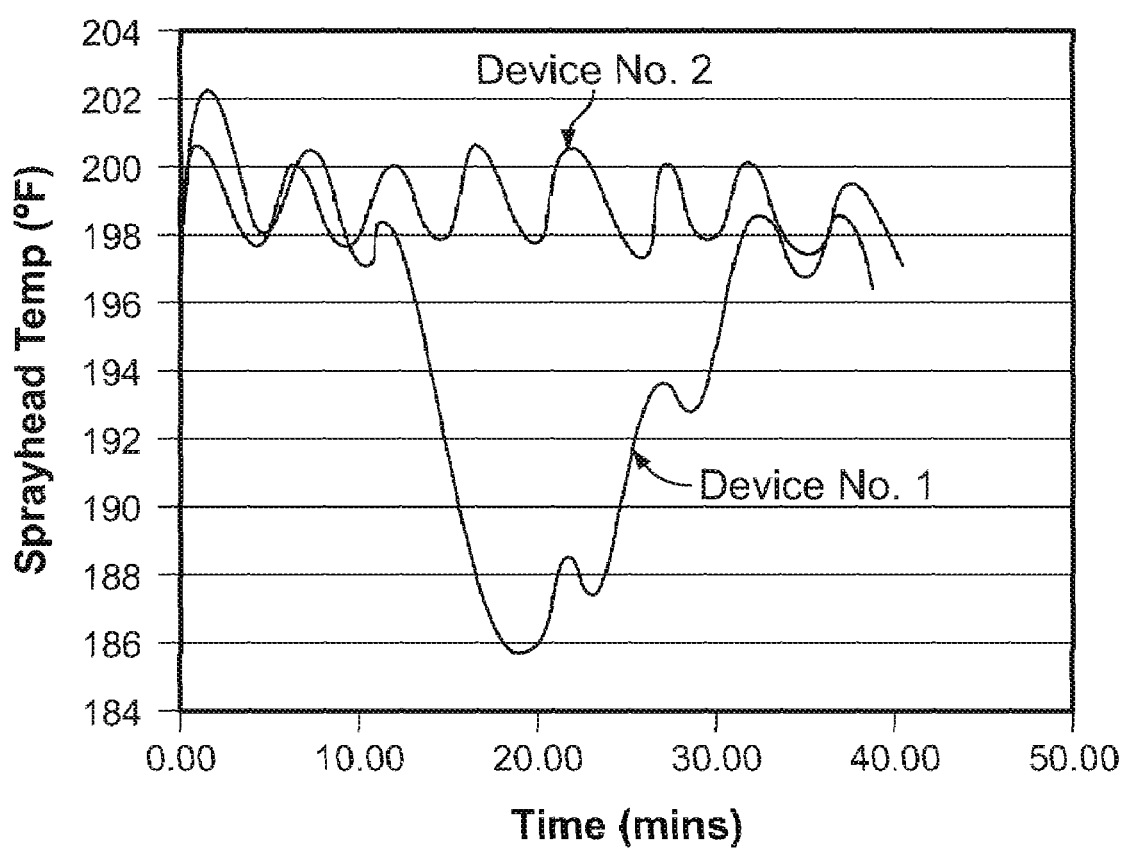
FIG. 3 is a graphical representation of water temperature versus time.

FIG. 3. Illustrates the effect on the temperature of water at the outlet point or spray head of an automatic brewing device during 8 brew cycles of the positioning of the temperature sensor and the active heat element relative to the reservoir. Brew Device No. 1 represents a conventional top-mounted heater having a cold pin length that does not extend into the inlet zone, and a top-mounted temperature sensor positioned to detect the water temperature above the inlet zone. A new brew cycle is shown commencing every 5 minutes and spray head temperatures are depicted. Brew Device No. 2 represents a heated water apparatus according to this disclosure, and, in other ways is identical to Brew Device No. 1 except that the temperature sensor 30 is positioned within the inlet zone 50, the heater 26 positioned as low as possible in the inlet zone 50, and including a cold pin 54 having a length that extended into the inlet zone 50. The identical reservoir 22 dimensions are present in both devices. The same control circuit 42 and testing parameters are utilized to operate and test both brew devices.

A more specific example relating to FIG. 3. And provide representative dimensions is provided for further information and not limitation. Brew Device No 1 represents a conventional top-mounted heater having a cold pin length of approximately 8 inches, and a top-mounted temperature sensor positioned to detect the water temperature approximately 15¾ inches from the bottom of the reservoir. The reservoir contains a water volume of approximately 530 ounces with a reservoir depth of approximately 22½ inches. Each brew cycle has a volume of water that is discharged/replaced of approximately 128 ounces of water. A new brew cycle is shown commencing every 5 minutes and spray head temperatures are depicted. Brew Device No. 2 includes the teaching herein and represents a heated water apparatus according to this disclosure, and, in other ways is identical to Brew Device No. 1 except that the temperature sensor 30 is positioned 7½ inches from the bottom of the reservoir with the heater 26 positioned as low as possible in the inlet zone 50. The identical reservoir 22 dimensions are present in both devices. The same control circuit 42 and testing parameters are utilized to operate and test both brew devices.

FIG. 3 demonstrates that the non-limiting exemplary embodiments of this disclosure show that positioning the temperature sensor, or the temperature sensor and the active heat element, of a water heating system in the lower portion or inlet zone of the reservoir provide improved temperature consistency over back-to-back discharge cycles. The characteristics of the system, method and apparatus disclosed is that the device generally cannot get behind or cannot fall outside of a desirable brewing temperature due to the improved positioning and operation of the related components. Additionally, the sensor is positioned above the heating element because heat will rise and not travel downwardly toward the bottom. Additionally, it is important not to position the temperature sensor too close to the heating element otherwise a false reading may occur.

Generally, the disclosed system, method and apparatus provide placing the heater as low as possible in the reservoir yet not positioning it to a point where possible mineral accumulation in the bottom of the reservoir will cause interference with heating. Additionally, it is desirable to place a temperature sensing probe or sensor in a lower portion of the reservoir generally positioned proximate a bottom of the reservoir. The temperature sensor should generally be positioned no higher than approximately one discharge volume off of the bottom of the reservoir. It is also desirable to introduce the unheated water in the bottom portion of the reservoir generally proximate to and close to the actively heated area. These spacings, locations and parameters can be determined or adjusted for each system and the associate set of specific components. Different components may result in variations in the specific placement of the components in the system. For example, it might be helpful to position the temperature sensor in the general location as described herein but space it slightly further away from a higher wattage heater to maintain the accuracy of the sensor reading.

Additionally, it is desirable to have the discharge or outlet point relatively high in the tank and approximately in the area of one discharge volume in the upper portion of the reservoir. In other words, generally all the temperature sensing and heating as well as the introduction of unheated water occurs within a volume of approximately one discharge volume in a lower portion of the reservoir. This results in generally concentrating all of the heating, sensing and introduction activity in a single area. It is desirable such that there is maximum heat transfer from the heating element to the unheated water to quickly and efficiently elevate the temperature of the unheated water to a generally desired level. Additionally, it is desirable to place the sensor in a lower area such that if the temperature in this lower area is below a desired level the sensor will detect this and initiate a heating cycle. This is in contrast to placing a temperature sensor in the upper portion. When a temperature sensor is placed generally in the upper portion of the reservoir the temperature sensor is detecting the temperature of the water which has naturally risen due to convection currents. This may be considerably different from the temperature in the lower portion of the reservoir, which is usually much lower than the upper portion of the reservoir.

By combining the above reference elements, the consistency of delivered temperature for back-to-back discharge performance is improved. By extending the temperature probe depth, changing the configuration and location of the heater to concentrate active heating to the lower portion of the reservoir, the components of the system may be optimized. The result is providing water at the outlet point which is generally consistent at a desired temperature.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

What is claimed is:

1. A water heating system comprising:
   a reservoir for containing water;
   a lower portion of the reservoir defining an inlet zone; and an upper portion of the reservoir defining and outlet zone;
   a water inlet in fluid communication with a source of water and the inlet zone;
   a heater having an active heating portion positioned in the inlet zone;
   a temperature sensor positioned for sensing temperature in the inlet zone;
   a water outlet in fluid communication with the outlet zone; and
   a controller coupled to the heater and the temperature sensor, the controller using information from the temperature sensor to controllably operate the heater to maintain a predetermined temperature within the reservoir;
   a top of the reservoir covering a generally open upper portion of the outlet zone; and
   the heater carried on and extending through the top and extending into the reservoir with the active heating portion of the heater positioned in the inlet zone, a cold plug portion of the heater positioned between the active heating portion and the top.

2. The water heating system of claim 1 further comprising:
   a bottom being defined in the reservoir; and
   positioning the heating element of the heater in close proximity to the bottom.

3. The water heating system of claim 2 further comprising positioning the active heating portion of the heater proximate to the bottom and a distance which is sufficient to prevent accumulation of mineral deposits extending between the active heating portion and the bottom.

4. The water heating system of claim 1 further comprising the temperature sensor positioned in the inlet zone in close proximity to the active heating portion of the heater.

5. The water heating system of claim 4 further comprising positioning the temperature sensor above the active heating portion of the heater.

6. The water heating system of claim 5 further comprising positioning the temperature sensor being positioned sufficiently spaced from the active heating portion of the heater to prevent detecting a false temperature signal.

7. The water heating system of claim 1 further comprising the inlet zone being defined by a volume approximately equal to a unit of volume to be dispensed.

8. The water heating system of claim 1 further comprising the outlet zone being defined as a unit of volume to be dispensed from the reservoir.

9. The water heating system of claim 1 further comprising the inlet zone being defined as a unit of volume to be dispensed, the outlet zone being defined as a unit of volume to be dispensed.

10. The water heating system of claim 1 further comprising the inlet zone being defined as a unit of volume to be dispensed, the outlet zone being defined as a unit of volume to be dispensed and one or more units of volume to be dispensed defined between the inlet zone and the outlet zone.

11. The water heating system of claim 1 further comprising the active heating portion of the heater being positioned in the upper portion of the inlet zone and operatively positioned below the temperature sensor positioned in the inlet zone.

12. The water heating system of claim 1 further comprising the water heating inlet being positioned in the lower portion of the inlet zone.

13. The water heating system of claim 1 further comprising the temperature sensor carried on and extending through the top, the temperature sensor extending into the reservoir to a position proximate to the active heating portion of the heater for sensing the temperature in the inlet zone.

14. A water heating system comprising:
a reservoir for containing water;
a lower portion of the reservoir defining an inlet zone; and
an upper portion of the reservoir defining and outlet zone;
a water inlet in fluid communication with a source of water and the inlet zone;
a heater having an active heating portion positioned in the inlet zone;
a temperature sensor positioned for sensing temperature in the inlet zone;
a water outlet in fluid communication with the outlet zone; and
a controller coupled to the heater and the temperature sensor, the controller using information from the temperature sensor to controllably operate the heater to maintain a predetermined temperature within the reservoir;
a top carried on the reservoir, the heater and the temperature sensor carried on and extending through the top; and
the heater extending into the reservoir for detecting the temperature of the water in the inlet zone and the temperature sensor extending into the reservoir to a position in the inlet zone proximate to and above the heater.

15. A water heating system comprising:
a reservoir for containing water;
a lower portion of the reservoir defining an inlet zone; and
an upper portion of the reservoir defining an outlet zone;
a water inlet in fluid communication with a source of water and the inlet zone;
a heater having an active heating portion positioned in the inlet zone;
a temperature sensor positioned for sensing temperature in the inlet zone;
a water outlet in fluid communication with the outlet zone; and
a controller coupled to the heater and the temperature sensor, the controller using information from the temperature sensor to controllably operate the heater to maintain a predetermined temperature within the reservoir; and
a reservoir defining a wall, the heater and the temperature sensor carried on and extending through the wall generally at a position proximate to the inlet zone with the active heating portion of the heater positioned in the inlet zone and the temperature sensor positioned in the inlet zone generally above the heater.

16. The water heating system of claim 15 further comprising the water inlet being coupled to a pressurized water line, a controllable valve being operatively associated with one of the inlet arid outlet lines, the controllable valve being coupled to the controller for controlling the dispensing of water from the reservoir.

17. The water heating system of claim 15 further comprising the inlet being coupled to a pour-over fill basin receiving a quantity of water to be dispensed into the reservoir.

18. The water heating system of claim 15 further comprising: a bottom being defined in the reservoir; and positioning the heating element of the heater in close proximity to the bottom.

19. The water heating system of claim 18 further comprising positioning the active heating portion of the heater proximate to the bottom and a distance which is sufficient to prevent accumulation of mineral deposits extending between the active heating portion and the bottom.

20. The water heating system of claim 15 further comprising the temperature sensor positioned in the inlet zone in close proximity to the active heating portion of the heater.

21. The water heating system of claim 20 further comprising positioning the temperature sensor above the active heating portion of the heater.

22. The water heating system of claim 21 further comprising positioning the temperature sensor being positioned sufficiently spaced from the active heating portion of the heater to prevent detecting a false temperature signal.

23. The water heating system of claim 15 further comprising the inlet zone being defined by a volume approximately equal to a unit of volume to be dispensed.

24. The water heating system of claim 15 further comprising the outlet zone being defined as a unit of volume to be dispensed from the reservoir.

25. The water heating system of claim 15 further comprising the inlet zone being defined as a unit of volume to be dispensed, the outlet zone being defined as a unit of volume to be dispensed.

26. The water heating system of claim 15 further comprising the inlet zone being defined as a unit of volume to be dispensed, the outlet zone being defined as a unit of volume to be dispensed and one or more units of volume to be dispensed define between the inlet zone and the outlet zone.

27. The water heating system of claim 15 further comprising the active heating portion of the heater being positioned in the upper portion of the inlet zone and operatively positioned below the temperature sensor positioned in the inlet zone.

28. The water heating system of claim 15 further comprising the water heating inlet being positioned in the lower portion of the inlet zone.

29. A heated water apparatus comprising:
a reservoir for heating water;
a lower portion of the reservoir defining an inlet zone;
an upper portion of the reservoir defining an outlet zone;
a water inlet positioned proximate to an in communication with the inlet zone, the water inlet being connectable to a water source;
a heater having an active heating portion positioned in the inlet zone;
a temperature sensor positioned in the inlet zone for sensing temperature in the inlet zone; a water outlet positioned in an in communication with the outlet zone; and
a controller coupled to the heater and temperature sensor, the controller operating the heater in response to the temperature sensor for maintaining at least one of a predetermined temperature and a temperature range within the reservoir;
a top of the reservoir covering a generally open upper portion of the outlet zone; and
the heater carried on and extending through the top and extending into the reservoir with the active heating portion of the heater positioned in the inlet zone, a cold plug portion of the heater positioned between the active heating portion and the top.

30. The heated water apparatus of claim 29 further comprising a top carried on the reservoir, the temperature sensor carried on and extending through the top, the temperature sensor extending into the reservoir to a position proximate to the active heating portion of the heater for sensing the temperature in the inlet zone.

31. A heated water apparatus comprising:
a reservoir for heating water;
a lower portion of the reservoir defining an inlet zone;
an upper portion of the reservoir defining an outlet zone;

a water inlet positioned proximate to an in communication with the inlet zone, the water inlet being connectable to a water source;

a heater having an active heating portion positioned in the inlet zone;

a temperature sensor positioned in the inlet zone for sensing temperature in the inlet zone;

a water outlet positioned in an in communication with the outlet zone; and a controller coupled to the heater and temperature sensor, the controller operating the heater in response to the temperature sensor for maintaining at least one of a predetermined temperature and a temperature range within the reservoir;

a top carried on the reservoir, the heater and the temperature sensor carried on and extending through the top; and the heater extending into the reservoir for detecting the temperature of the water in the inlet zone and the temperature sensor extending into the reservoir to a position in the inlet zone proximate to and above the heater.

32. A heated water apparatus comprising:

a reservoir for heating water;

a lower portion of the reservoir defining an inlet zone;

an upper portion of the reservoir defining an outlet zone;

a water inlet positioned proximate to an in communication with the inlet zone, the water inlet being connectable to a water source;

a heater having an active heating portion positioned in the inlet zone;

a temperature sensor positioned in the inlet zone for sensing temperature in the inlet zone;

a water outlet positioned in an in communication with the outlet zone; and a controller coupled to the heater and temperature sensor, the controller operating the heater in response to the temperature sensor for maintaining at least one of a predetermined temperature and a temperature range within the reservoir; and a reservoir defining a wall, the heater and the temperature sensor carried on and extending through the wall generally at a position proximate to the inlet zone with the active heating portion of the heater positioned in the inlet zone and the temperature sensor positioned in the inlet zone generally above the heater.

33. The heated water apparatus of claim 32 further comprising the water inlet being coupled to a pressurized water line, a controllable valve being operatively associated with one of the inlet and outlet lines, the controllable valve being coupled to the controller for controlling the dispensing of water from the reservoir.

34. The heated water apparatus of claim 32 further comprising the inlet being coupled to a pour-over fill basin receiving a quantity of water to be dispensed into the reservoir.

35. A method of heating water for dispensing, the method comprising the steps of:

providing a reservoir, the reservoir defining at least an inlet zone and an outlet zone being defined by a unit of volume to be dispensed;

providing a heater having an active heating portion;

providing a temperature sensor; providing a water source for providing water to the reservoir;

providing an outlet communicating with the outlet portion of the reservoir;

dispensing water into the inlet zone of the reservoir;

detecting the temperature of the water in the inlet zone;

activating the heater in response to at least one of a change in the temperature and sensing of a predetermined temperature in the inlet zone;

providing a top of the reservoir covering a generally open upper portion of the outlet zone; and providing the heater carried on and extending through the top and extending into the reservoir with the active heating portion of the heater positioned in the inlet zone, a cold plug portion of the heater positioned between the active heating portion and the top.

36. The method of heating water of claim 35 further comprising:

providing a bottom being defined in the reservoir; and positioning the heating element of the heater in close proximity to the bottom.

37. The method of heating water of claim 36 further comprising positioning the active heating portion of the heater proximate to the bottom and a distance which is sufficient to prevent accumulation of mineral deposits extending between the active heating portion and the bottom.

38. The method of heating water of claim 35 further comprising positioning the temperature sensor in the inlet zone in close proximity to the active heating portion of the heater.

39. The method of heating water of claim 38 further comprising positioning the temperature sensor above the active heating portion of the heater.

40. The method of heating water of claim 39 further comprising positioning the temperature sensor being positioned sufficiently spaced from the active heating portion of the heater to prevent detecting a false temperature signal.

41. The method of heating water of claim 35 further comprising defining the inlet zone by a volume approximately equal to a unit of volume to be dispensed.

42. The method of heating water of claim 35 further comprising defining the outlet zone as a unit of volume to be dispensed from the reservoir.

43. The method of heating water of claim 35 further comprising defining the inlet zone as a unit of volume to be dispensed, and defining the outlet zone as a unit of volume to be dispensed.

44. The method of heating water of claim 35 further comprising defining the inlet zone as a unit of volume to be dispensed; defining the outlet zone as a unit of volume to be dispensed; and defining one or more units of volume to be dispensed between the inlet zone and the outlet zone.

45. The method of heating water of claim 35 further comprising positioning the active heating portion of the heater being in the upper portion of the inlet zone and below the temperature sensor positioned in the inlet zone.

46. The water heating system of claim 35 further comprising positioning the water heating inlet being in the lower portion of the inlet zone.

47. The method of heating water of claim 35 further comprising providing a top carried on the reservoir, the temperature sensor carried on and extending through the top, the temperature sensor extending into the reservoir to a position proximate to the active heating portion of the heater for sensing the temperature in the inlet zone.

48. The method of heating water of claim 35 further comprising providing a top carried on the reservoir, the heater and the temperature sensor carried on and extending through the top; the heater extending into the reservoir for detecting the temperature of the water in the inlet zone and the temperature sensor extending into the reservoir to a position in the inlet zone proximate to and above the heater.

49. A method of heating water for dispensing, the method comprising the steps of:
providing a reservoir, the reservoir defining at least an inlet zone and an outlet zone being defined by a unit of volume to be dispensed;
providing a heater having an active heating portion;
providing a temperature sensor; providing a water source for providing water to the reservoir;
providing an outlet communicating with-the outlet portion of the reservoir;
dispensing water into the inlet zone of the reservoir;
detecting the temperature of the water in the inlet zone;
activating the heater in response to at least one of a change in the temperature and sensing of a predetermined temperature in the inlet zone
providing a reservoir defining a wall; and
positioning the heater and the temperature sensor carried on and extending through the wall generally at a position proximate to the inlet zone with the active heating portion of the heater positioned in the inlet zone and the temperature sensor positioned in the inlet zone generally above the heater.

* * * * *